May 25, 1926. 1,586,340
G. TARAGLIO
PNEUMATIC ELASTIC SUSPENSION FOR VEHICLES
Filed June 26, 1924  2 Sheets-Sheet 1
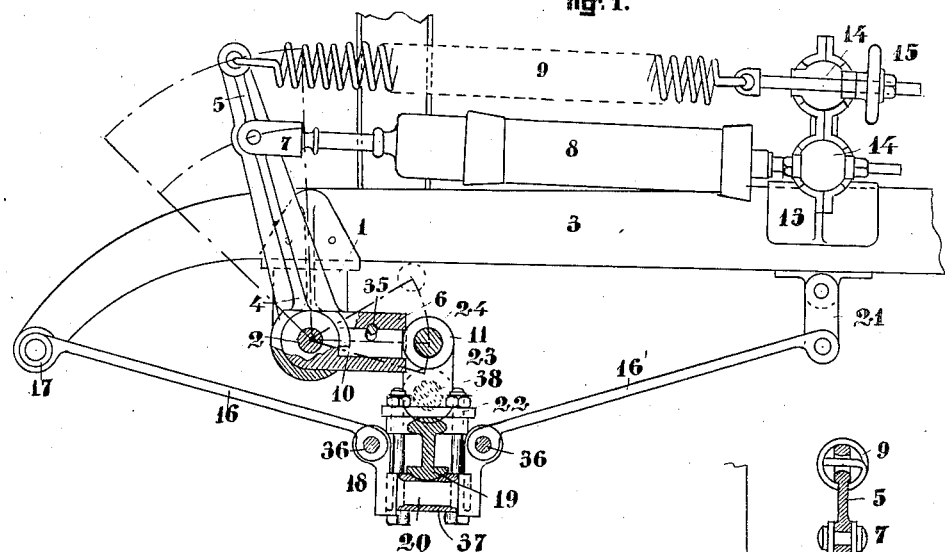
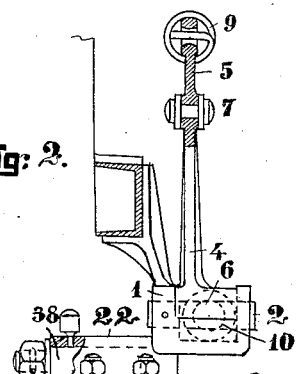
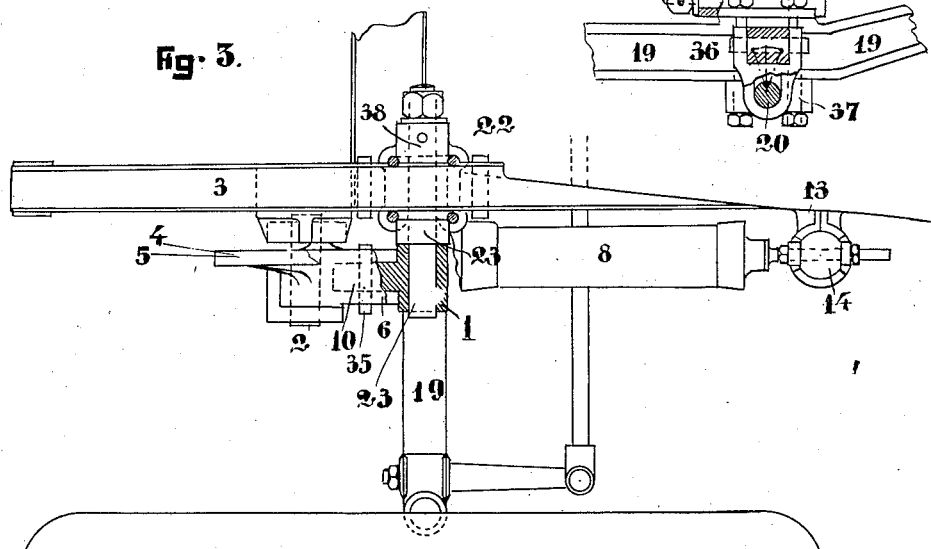
Inventor
Guiseppe Taraglio.
per  Attorney May 25, 1926. 1,586,340
G. TARAGLIO
PNEUMATIC ELASTIC SUSPENSION FOR VEHICLES
Filed June 26, 1924. 2 Sheets-Sheet 2

Inventor
Guiseppe Taraglio
per
Attorney.

Patented May 25, 1926.

1,586,340

UNITED STATES PATENT OFFICE.

GIUSEPPE TARAGLIO, OF ROME, ITALY.

PNEUMATIC ELASTIC SUSPENSION FOR VEHICLES.

Application filed June 26, 1924. Serial No. 722,584.

This invention relates to a device constituting a perfect pneumatic elastic suspension intended to eliminate the necessity of the usual semi-elliptical springs.

In the annexed drawings showing a practical embodiment of the invention:—

Figure 1 is a side elevation of the device applied to the wheel and to the frame of the vehicle;

Figure 2 is an end view of the same device;

Figures 3 and 4 are details thereof;

Figure 5:
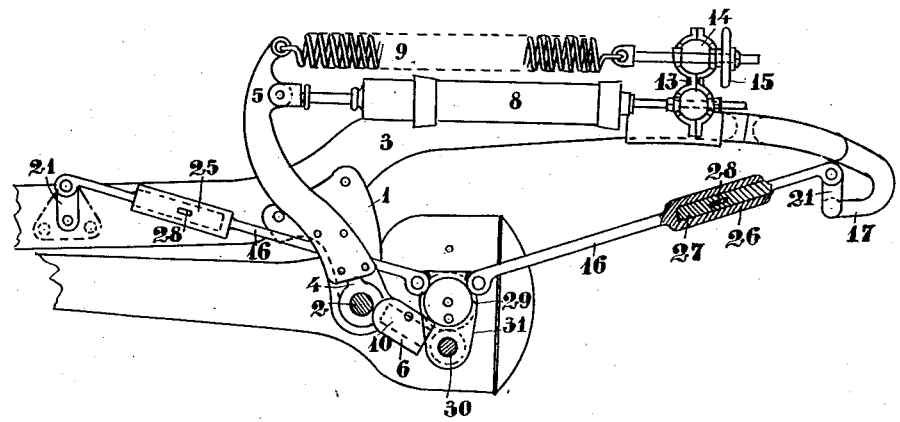
Figures 5 and 6 show the device applied to the wheel of a motor-car seen from one side and from the top respectively.

As it can be seen in the drawing, the elastic suspension, according to this invention includes; a support 1, with a pivot 2, fastened on the frame of the vehicle 3 and bearing an angle lever 4 with two arms 5 and 6; the arm 5 bears a pivot joint 7 which connects it to a cylinder 8 placed horizontally on the frame, and is connected at its end to a spiral spring 9; the arm 6 is provided with a longitudinal hole wherein engages a pivot 10, ending in a cylindrical head 11 through which is bored a hole. Within the cylinder 8 runs a plunger 12 which is not air tight, the stem of the plunger passing into a sleeve of the screw cover of the cylinder is connected at 7 to the arm 5 of the lever 4. The bottom of the cylinder bears an extension which may be screwed on a ball joint 14 carried by the support 13 fastened on the frame of the vehicle; the position of the extension in the joint being adjusted by screwing it more or less on the support itself.

The spiral spring 9 is placed outside the cylinder 8 and almost in a parallel line to the latter; it is hooked on one side on the end of arm 5 and on the other on a ball joint 14' forming also a part of support 13.

The support 13 carrying the ball joints bears a small hand wheel 15 with a screw nut, by means of which can be adjusted the tension of the spiral spring 9.

Two flat steel bars 16 are linked one on one side of the frame end 17, just like the usual semi-elliptical springs, and on the other, by means of a pin 36, on a U-shaped attachment 18 rotatable about a pivot 20 passing through a support 37 placed below the axle 19 and secured to the latter by means of screws or bolts, said attachment being thus free to oscillate about an axis at right angles to that of the axle 19. The attachment 18 has also the second rod 16' attached to it in the same manner as rod 16, the second rod being connected to the shackles 21 on the frame.

Figure 6:
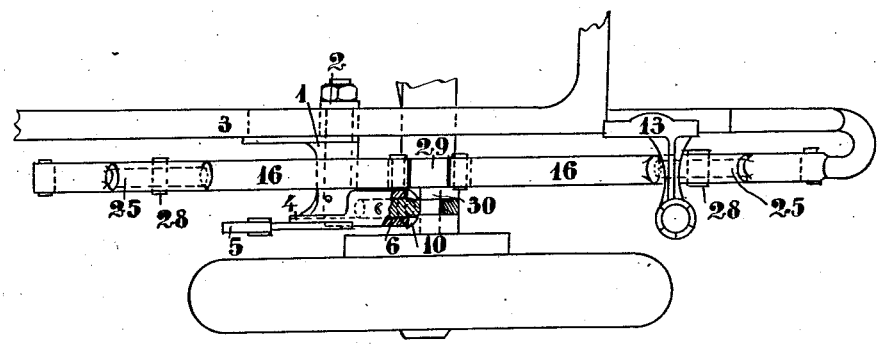
Figure 4:
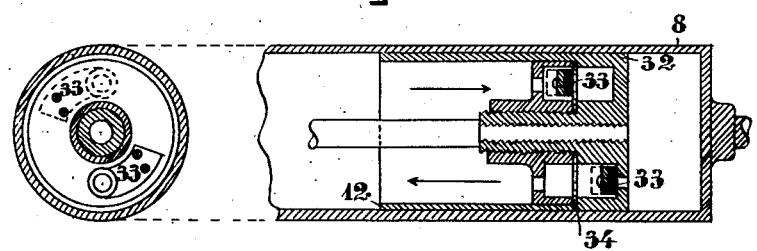

Above the axle 19 there is arranged a bearing 22 connected by means of bolts or screws to the support 37 and crossed by the pin 38 of a crank 23 which may oscillate about the center of the bearing 22. The crank 23 is also provided with a crank pin 24 engaging the head 11 of the pivot 10, the said pivot being arranged within a longitudinal slot or socket in the arm 6 of the bell crank lever 4 where it may oscillate, a key or pin 35 securing the pivot 10 within the said arm 6. The bars which substitute the rear springs have each, Figs. 5 and 6, a loose joint 25, designed to prevent any distortion stress in the working of the suspension. Said loose joint is formed by a plain cylindrical sleeve 26 wherein enters the cylindrical extension 27 of the remaining part of the bar connected to the shackle 21. A key 28 suitably inserted, prevents the parts forming the joint coming out of engagement and also limiting their angle of axial oscillation.

For applying the suspension to the rear axle of motor cars (Figures 5 and 6), the rods at their ends nearest the axle are pivoted to the collar 29 oscillating in respect of the back axle casing, the said collar having an extension 31 within which the end 30 of the pivot 10 enters and is pivoted to the said collar, the pivot being mounted in a longitudinal slot or socket in the arm 6 of the bell crank lever 4.

Every shock of the wheel, caused by the unevenness of the soil is almost completely absorbed by the work necessary in moving the plunger 12 within the cylinder 8; said plunger tending to return in its former position, owing to the effect of the spring 9.

In order to graduate the resistance of the air during the movement of the plunger, the bottom 32 is provided with efflux ports some of which are controlled by flexible valves. 33 which close them automatically during the first displacement of the plunger; and open them on the return stroke.

The flexible valves 33 are made of leather or any other elastic substance; their movement in either direction, to close or open the corresponding ports, is determined by the compression of the air caused by the movement of the plunger.

The object of this arrangement of the valves is to obtain a quicker return of the plunger 12 so as to allow the latter to be as soon as possible ready to pneumatically deaden the shock received, should a second obstacle present itself under the wheel. The closing of the valve, which takes place when the plunger is compelled to come out from the cylinder on account of the shock received by the wheel, prevents a too rapid movement of the plunger, thus securing to the latter a sufficient work to deaden or check the shock. Besides the valves placed on the bottom 32 of the plunger others may be provided upon one or more diaphragms 34 wherewith the plunger might be supplied inside. Said valves have the same object as those already described and warrant even a better working of the plunger for the purpose aimed at.

The above valves are very plain and are fastened at the bottoms and to the diaphragms by means of simple screws. The valves can be of any suitable known type such as ball valves or the like.

Claims:—

1. A flexible suspension system for vehicles, comprising a bell crank lever, a pneumatic resistance device attached to the one arm of said lever, means for the attachment of the other arm to the axle of the vehicle, an attachment capable of oscillation about an axis at right angles to the said axle, and a pair of rods, each pivotally connected at one end to the vehicle frame and at the opposite end to the said attachment.

2. A suspension system according to claim 1, in which the said resistance device comprises a cylinder, a plunger mounted within the cylinder, a plurality of air valves in the piston for permitting the passage of air when the piston is moving in one direction and preventing the passage of air when the piston is moving in the opposite direction, and a spring connected to the said bell crank lever for returning the piston to its normal position.

3. A suspension system according to claim 1, in which the resistance device comprises a cylinder, a plunger working within the cylinder, a spring for returning the piston to its normal position, and means for the attachment of the said cylinder and of the said spring to the frame of the vehicle comprising universal ball joints, a screw threaded rod passing through the joint for the said spring, and a hand wheel on the said rod for adjusting the tension of the spring.

4. A suspension system according to claim 1, in which the connection between the bell crank lever and the axle of the vehicle comprises a bearing mounted on and extending longitudinally of the axle, a shaft carried in said bearing, a crank web carried by said shaft, a pin carried by the web, a socket in the one arm of the bell crank lever, a pin mounted in the said socket, and a bearing on the outer end of the said pin for receiving the pin carried by the said web.

5. A suspension system according to claim 1, in which the said oscillating attachment comprises a U-shaped member, a pivot beneath and parallel to the axle of the vehicle for carrying said member, and means on the upper ends of the said member for the pivotal connection thereof to the said rods which take the place of the usual leaf springs.

In testimony whereof I have affixed my signature this 10th day of June, 1924.

GIUSEPPE TARAGLIO.